United States Patent [19]

Lemkin

[11] Patent Number: 4,489,465
[45] Date of Patent: Dec. 25, 1984

[54] SECURITY FASTENER

[76] Inventor: Jack Lemkin, 5900 Mohican La., Cincinnati, Ohio 45243

[21] Appl. No.: 498,725

[22] Filed: May 27, 1983

[51] Int. Cl.³ .................. A44B 17/00; F16B 13/04
[52] U.S. Cl. ..................................... 24/289; 24/297; 411/508
[58] Field of Search .................. 24/289, 291, 292, 293, 24/294, 297, 573, 621, 622, 623; 411/508, 509, 510

[56] References Cited

U.S. PATENT DOCUMENTS

| | | | |
|---|---|---|---|
| 2,758,498 | 8/1956 | Johnson | 411/508 |
| 3,093,874 | 6/1963 | Rapata | 24/297 |
| 3,722,037 | 3/1973 | Jaeger | |
| 3,727,271 | 4/1973 | Znamirowski | |
| 3,779,374 | 12/1973 | Bockenstette | |
| 3,811,154 | 5/1974 | Lindeman et al. | |
| 3,893,208 | 7/1975 | Yuda | 411/508 |
| 4,122,583 | 10/1978 | Grittner et al. | 24/297 |
| 4,312,614 | 1/1982 | Palmer et al. | |

Primary Examiner—Victor N. Sakran

Attorney, Agent, or Firm—Martin P. Hoffman; Mitchell B. Wasson; Charles W. Fallow

[57] ABSTRACT

An integrally formed fastener molded of plastic material. Such fastener comprises an enlarged head, a shank, shoulders defined near the upper end of the shank, a pair of flexible wings joined to the lower end of the shank, and a pair of stops defined on the shank to limit the movement of the wings toward the shank. The wings flex inwardly until they contact the stops, and then the wings roll inwardly about the stops as the fastener is pushed through aligned apertures in security boxes, panels, etc. While the plastic material, such as polypropylene, possesses sufficient resiliency to be rolled inwardly, the wings will break and/or the shank may fail when the fastener is forcibly withdrawn from its seated position, thus providing a positive indication of an attempted breach of security. Since shoulders are formed on the upper end of the shank, the head of the fastener is positioned above the upper surface of the security box, when the fastener is fully engaged; the head of the fastener can then be cut off, again indicating a breach of security.

7 Claims, 6 Drawing Figures

SECURITY FASTENER

BACKGROUND OF THE INVENTION

This invention relates generally to plastic, integrally molded security fasteners which are passed through apertures in adjacent panels or elements to join the elements together. More particularly, the invention relates to a tamper-indicating security fastener that provides a tell-tale sign that someone has attempted to breach the security of the panels or elements, such as a tote box and cover, that were intended to be held together by the fastener.

The instant security fastener is well suited to secure the cover to the container of a tote box assembly. Tote boxes are commonly used for delivery of sundry goods from a manufacturer, wholesaler or distributor, etc. to a supermarket, variety store, department store, or the like. The tote box assemblies, such as those shown in U.S. Pat. Nos. 3,360,162 and 3,379,341, have apertures formed in the cover and the container, and, when these apertures are aligned, security fasteners are snapped into the apertures to lock the cover to the container. The secured box deters pilferage, retains the merchandise within the box during shipment, and yet can readily be unlocked, when needed.

Several types of security fasteners have been, and presently are, used with existing tote box assemblies. One security fastener that has enjoyed considerable commercial acceptance is disclosed in U.S. Pat. No. 3,779,374, granted Dec. 18, 1973 to Kenneth R. Bockenstette. The fastener (22) shown in such patent is a plastic structure having a pair of locking parts (28) connected to the free end of the shank (26) of the fastener and the head (24) of the fastener, respectively. The locking parts include perpendicularly disposed locking surfaces (36) and inclined cam surfaces (50) leading thereto from the free end of the shank part. During the fastener inserting operation, the cam surfaces are operable to flex the locking parts with both (1) a torsional movement, and (2) an inward bending movement.

Another security fastener, which is executed in plastic, is described in U.S. Pat. No. 4,312,614, granted Jan. 26, 1982 to John P. Palmer et al. Such fastener includes inner and outer members (1,2) interconnected by flexible straps, or struts (30). The manner in which this fastener functions is shown in FIGS. 2a-2e of the Palmer et al. patent, and the fastener is utilized specifically with a tote box in FIG. 9.

While the above described security fasteners performed satisfactorily under most conditions, certain drawbacks were encountered. For example, the fastener disclosed by Palmer et al. was relatively complex and the tolerances would be difficult to maintain when molding such fasteners by conventional mass production techniques. The fastener disclosed by Bockenstette requires a special tool for insertion, and the cost and inconvenience of using a special tool limit the appeal of such fastener.

SUMMARY

Thus, with the shortcomings of known security fasteners clearly in mind, and fully realizing the necessity of designing a security fastener that is compatible with the large number of tote boxes presently in use, the instant invention contemplates a fastener that is simple in design, can readily be executed in a wide variety of plastics, and lends itself to mass production techniques. Furthermore, the instant invention contemplates a fastener that can be removed from the apertures by two different operations; however, in both instances, the fastener provides a tell-tale indication that someone has attempted to breach the security of the container to which the fastener has been applied.

These, and other desirable operational characteristics, are achieved by the instant invention which discloses a molded plastic security fastener including, inter alia, a head, a shank, a pair of wings extending upwardly and angularly outwardly from the shank, and laterally projecting stops defined on the opposite sides of the shank. The spatial relationship of the wings to the stops is selected so that the wings flex inwardly toward the stops during the insertion operation, and then roll about the stops until the head is seated. Shoulders defined on the cruciform section of the shank situated below the head space the head above the elements being joined, and insure the desired interaction between the wings and the stops.

The fastener may be molded from a variety of plastics, but polypropylene is preferred. The fastener must be sturdy, easy to mold with a minimum amount of shrinkage, and be flexible, yet resilient. Furthermore, the fastener must yield before the elements being secured together suffer permanent damage or deformation.

Several other advantages and desirable attributes achieved by the instant invention will become readily apparent from the appended drawings, when construed in harmony with the specification.

DESCRIPTION OF PREFERRED EMBODIMENT

Figure 1:
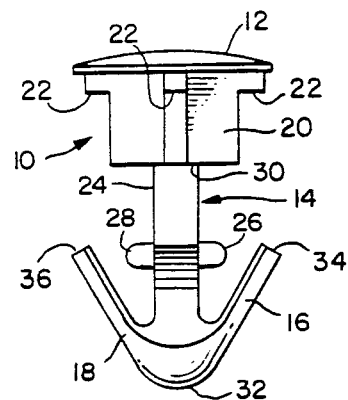
FIG. 1 is a front elevational view of a unique security fastener constructed in accordance with the principles of the instant invention.

Referring now to FIG. 1, the unique fastener 10 comprises an enlarged head 12, a shank indicated generally by reference numeral 14, and a pair of wings 16,18 formed adjacent to the lower end of the shank. The shank 14 consists of (1) an upper, cruciform-shaped segment 20 with shoulders 22 defined on each arm of the crucifix, and (2) a solid stem 24. A pair of laterally projecting stops 26,28 are formed on opposite sides of the stem 24, and the outer edges of the stops are arcuate in shape.

An area 30 of reduced thickness is formed by the intersection of stem 24 and segment 20. The area 30 of reduced thickness serves as a stress concentration point. The lower end 32 of the stem is spherical in shape, as shown in FIGS. 1 and 2.

The upper ends of wings 16,18 project above stops 26,28. Wing 16 extends outwardly at an angle of approximately 60° to a horizontal plane passing through end 32 of the stem, and wing 18 extends outwardly at an angle of approximately 60° to such horizontal plane, although in the opposite direction. The wings 16,18 thus subtend an angle of approximately 60° therebetween. The upper surface 34 of wing 16 defines an angle of approximately 30° with a horizontal plane passed through the shank of the fastener, while the upper surface 36 of wing 18 similarly defines an angle of 30°, although in the opposite direction.

Figure 2:
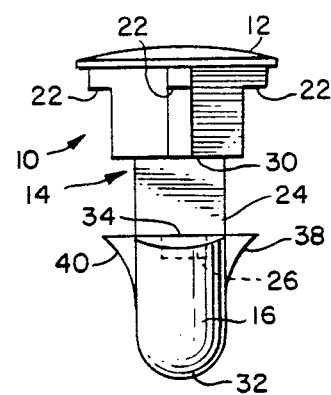
FIG. 2 is a side elevational view of the security fastener of FIG. 1.

FIG. 2 reveals additional details of wing 16, although wing 18, which is not shown, is identical in shape. A first rib 38 is located at one side of the wing at its upper end, while a second rib 40 is located on the opposite side of the wing. The ribs are substantially wider at their upper end than at their lower ends.

Furthermore, although FIG. 2 is not a scale drawing, certain size relationships are accurately shown. For example, the diameter from the outer edge of rib 38 to the outer edge of rib 40 is greater than the diameter of the segment 20, but less than the diameter of head 12. The ribs 38,40 deform to match the hole size into which the fastener is inserted, but then expand outwardly to strongly resist removal therefrom. The relatively large dimension from the outer edge of rib 38 to the outer edge of rib 40 precludes removal of the fastener, in the event that an attempt is made to remove the rivet by bending the wings 16,18 inwardly.

Figure 3:
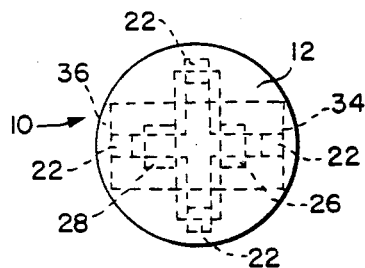
FIG. 3 is a top plan view of the security fastener of FIG. 1.

FIG. 3 shows the circular shape of the head 12 of the fastener, and the dotted outline reveals the cruciform shape of segment 20 and the location of the four shoulders 22. The spatial relationship of stops 26,28 to stem 24 is also visible.

Figure 4:
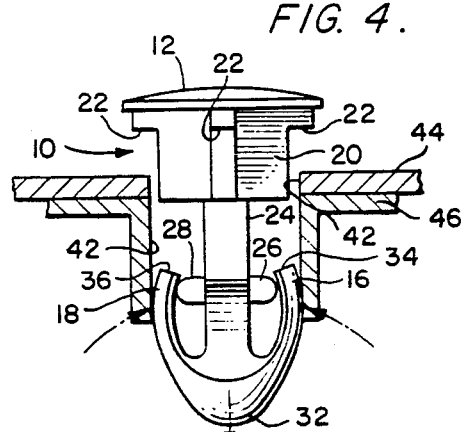
FIG. 4 is a front elevational view showing the wings of the security fastener of FIG. 1 flexing inwardly and rolling about the stops as the security fastener is inserted into an opening.

FIG. 4 illustrates the fastener 10 during the course of its insertion into a hole 42 in a box, panel, or the like. The lateral dimensions of the hole 42 are suggested by the vertically extending lines in FIG. 4. The lower spherical end 32 of the fastener serves as the leading edge of the fastener, and the wings 16,18 flex inwardly as the fastener enters hole 42. As the fastener 10 is pressed deeper into the hole, the wings continue to flex inwardly until they contact stops 26,28. The inward flexure of the wings is indicated by the directional arrows.

Figure 5:
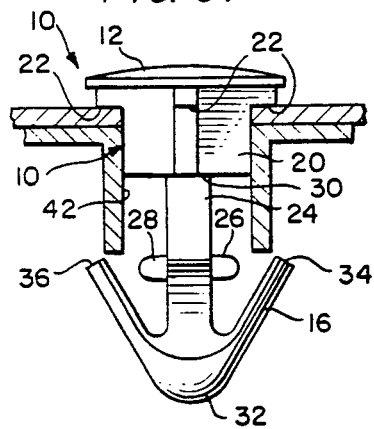
FIG. 5 is a front elevational view showing the security fastener of FIG. 1 in its seated condition.

As the fastener 10 continues further downward, the free ends of the wings 16,18 roll about stops 26,28 and extend a slight distance toward the stem 24, as shown in FIG. 4. When the fastener is fully seated, as shown in FIG. 5, wings 16,18, which have been temporarily deformed, spring outwardly to resume their normally outwardly biased orientation. The shoulders 22 are seated on the outer surface of upper panel 44, while the lateral distance from the upper surface 34 of wing 16 to the upper surface 36 of wing 18 exceeds the diameter of hole 42.

Consequently, if one attempts to withdraw fastener 10 from the hole 42, the wings 16,18 contact the lower end of the portion of panel 46 that defines hole 42. The continued application of upwardly directed forces will spread the wings further and further apart, until the wings fracture and the fastener 10 can be withdrawn. However, either the fracture of the fastener, or the complete removal thereof from hole 42, will provide a positive indication that someone has defeated the security fastener and has attempted to breach the integrity of box or panel.

Alternatively, since shoulders 22 retain the head 12 above the outer surface of panel 44, the head 12 may be struck by manual tools, such as a hammer and chisel, until the stem fractures at area 30. Here, again, however, the fractured fastener can not be re-used, and provides a positive indication that security has been breached.

Figure 6:
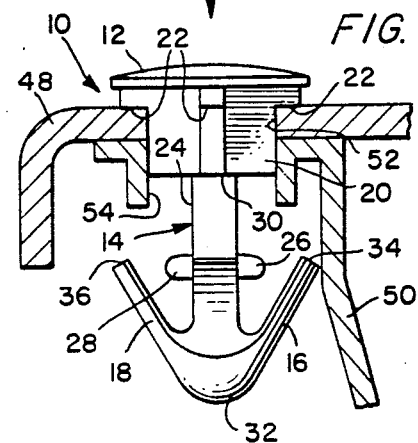
FIG. 6 is a front elevational view showing the security fastener of FIG. 1 in a seated condition in a tote box.

Whereas FIGS. 4 and 5 illustrate the operation of fastener 10 in securing together panels 44 and 46, FIG. 6 suggests the use of fastener 10 for securing an overlapping cover 48 to a tote box 50. Aperture 52 in cover 48 is aligned with aperture 54 in tote box 50, so that the fastener can be forced therethrough. Although only fragments of the cover and tote box are shown, it may be assumed that the cover and tote box are of conventional design. Representative, commercially available tote boxes are disclosed in U.S. Pat. Nos. 3,360,162 and 3,379,341. Fastener 10 functions in the same manner as previously described with reference to FIGS. 4 and 5.

Although the fastener 10 is described as comprising several distinct components, it should be realized that the fastener is an integrally formed, unitary, molded plastic member. The preferred plastic to be used for the fastener is polypropylene, for such plastic is readily molded, flexible yet resilient, relatively inexpensive, but capable of yielding before inflicting damage upon the tote box or panel to which it is secured. Other plastics may also be used, if they can satisfy the foregoing criteria. Modifications, revisions and refinements may occur to the skilled artisan after reviewing the preferred embodiment of the fastener set forth in the specification. Consequently, the appended claims should not be confined to their literal terms, but should be construed in a manner commensurate with the scope of this invention.

I claim:

1. A plastic security fastener adapted to secure together elements having apertures defined therein, said fastener being integrally molded from a flexible yet resilient plastic, said fastener comprising:
   (a) an enlarged head,
   (b) a shank depending below said head,
   (c) said shank consisting of an upper segment and a solid stem,
   (d) a plurality of shoulders formed on the upper segment,
   (e) a pair of wings normally extending upwardly and angularly outwardly from the lower end of said stem,
   (f) laterally projecting stop means defined on said stem,
   (g) the upper ends of said wings projecting above a horizontal plane passing through said stop means,
   (h) said wings being flexed inwardly until they engage said stop means as the fastener is inserted into the apertures in said elements,
   (i) and the upper ends of said wings being rolled about said stop means as the fastener is advanced further into the apertures,
   (j) the engagement of said shoulders with the elements being joined together defining the limit of the insertion of the fastener,
   (k) said wings then flexing resiliently outwardly to return to their normal, unstressed position which locks the fastener within the apertures in the elements.

2. A security fastener as defined in claim 1 wherein the upper segment of said shank is cruciform-shaped and a shoulder is formed on each arm of the crucifix.

3. A security fastener as defined in claim 1 wherein the end of the stem remote from the head terminates in a spherical surface.

4. A security fastener as defined in claim 1 wherein outwardly extending ribs are formed at the upper end of each wing.

5. A security fastener as defined in claim 4 wherein the lateral dimension of each wing from the outer edge of one rib to the outer edge of the other rib exceeds the lateral dimension of the upper segment of said shank, but is less than the lateral dimension of said head.

6. A security fastener as defined in claim 1 wherein the junction of the stem and the upper segment of said shank serves as a stress concentration point when the fastener is subject to a tensile force.

7. A security fastener as defined in claim 1 wherein said stop means comprises a pair of stops situated on opposite sides of said solid stem and in lateral alignment, each stop being curved to allow the free end of the cooperating wing to curve thereover.

* * * * *